(12) United States Patent
Zahradnik et al.

(10) Patent No.: US 7,975,779 B2
(45) Date of Patent: Jul. 12, 2011

(54) THREADED CONE RETENTION SYSTEM FOR ROLLER CONE BITS

(75) Inventors: Anton F. Zahradnik, Sugar Land, TX (US); Don Q. Nguyen, Houston, TX (US); Eric Sullivan, Houston, TX (US); Terry J. Koltermann, The Woodlands, TX (US); Aaron J. Dick, Houston, TX (US); Scott S. Shu, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 121 days.

(21) Appl. No.: 12/238,311

(22) Filed: Sep. 25, 2008

(65) Prior Publication Data
US 2010/0071959 A1 Mar. 25, 2010

(51) Int. Cl.
*E21B 10/08* (2006.01)
(52) U.S. Cl. .................. 175/57; 175/369; 384/96
(58) Field of Classification Search .......... 175/57, 175/331, 369; 384/92, 96
See application file for complete search history.

(56) References Cited

U.S. PATENT DOCUMENTS

| | | | | |
|---|---|---|---|---|
| 2,047,110 A | * | 7/1936 | Reed | 175/339 |
| 2,351,357 A | * | 6/1944 | Miller et al. | 384/96 |
| 2,787,502 A | * | 4/1957 | Huckshold | 384/96 |
| 3,251,425 A | * | 5/1966 | Bridwell et al. | 175/279 |
| 4,181,377 A | | 1/1980 | Oelke | |
| 4,538,928 A | | 9/1985 | Muma | |
| 4,722,615 A | * | 2/1988 | Bailey et al. | 384/96 |
| 4,874,047 A | | 10/1989 | Hixon | |
| 4,911,255 A | | 3/1990 | Pearce | |
| 4,991,671 A | | 2/1991 | Pearce et al. | |
| 5,137,097 A | * | 8/1992 | Fernandez | 175/228 |
| 5,383,525 A | | 1/1995 | Daly et al. | |
| 5,853,245 A | | 12/1998 | Price | |
| 6,871,859 B2 | * | 3/2005 | Lundblad et al. | 279/102 |
| 6,945,338 B1 | * | 9/2005 | Defourny et al. | 175/106 |

FOREIGN PATENT DOCUMENTS
EP 0837215 B1 1/2006
* cited by examiner

*Primary Examiner* — William P Neuder
*Assistant Examiner* — Catherine Loikith
(74) *Attorney, Agent, or Firm* — Bracewell & Giuliani LLP (57) ABSTRACT

An apparatus for retaining a roller cone on a bearing pin of a drill bit body that includes a drill bit body; a bearing pin coupled to the drill bit body; a retention member coupled to the bearing pin; a roller cone coupled to the retention member; and a torque transfer member coupled to the retention member and the roller cone adapted to selectively transfer torque between the retention member and the roller cone.

21 Claims, 12 Drawing Sheets

Fig. 6b ical shape in
THREADED CONE RETENTION SYSTEM FOR ROLLER CONE BITS

BACKGROUND

1. Field of Invention

This invention relates in general to rotary rock bits having rotating cone cutters and, more particularly, to systems for retaining the cone cutters on the rock bit assemblies.

2. Background of the Invention

A rotary rock bit generally consists of a main bit body adapted to be connected to a rotary drill string. A conventional bit usually includes two or more legs integrally connected with each leg assembly including a cone cutter rotatively mounted on a journal pin extending from the leg. Bearing assemblies are provided between the interengaging surfaces of each cone and journal pin to promote rotation of the cone. Finally, means are provided on the outer surface of the cone for disintegrating the formation as the bit and cone rotate.

Various types of bearings are utilized in the leg assemblies in various combinations. In present day rock bits, the two most prevalent combinations are: (a) the roller-ball-roller bearing system; and (b) the friction-ball-friction or solid journal bearing system. As noted, both systems utilize ball bearings. In a ball bearing assembly, the balls are inserted through a ball hole into a race formed by grooves located in opposed surfaces of the cone and journal. The main reason for utilizing ball bearing assemblies is to retain the cones on the journal. The shortcoming with such a utilization is that the ball bearing assemblies cannot absorb or efficiently transfer axial loads acting on the cones. Therefore, ball bearing assemblies have been utilized more for their cone retention ability and inward axial capability than for their outward axial load bearing capability. Furthermore, ball bearing assemblies are susceptible to spalling and require a ball plug hole, ball plug, and a weld to install such a system. These features may compromise the overall integrity or strength of the leg in some applications.

The present exemplary embodiments of the invention are directed to overcoming one or more aspects of conventional ball bearing retention assemblies.

SUMMARY OF INVENTION

According to one aspect of the invention, an apparatus for retaining a roller cone on a bearing pin of a drill bit body is provided that includes a drill bit body, a bearing pin coupled to the drill bit body, a retention member coupled to the bearing pin, a roller cone coupled to the retention member, and a torque transfer member movably coupled to the retention member and the roller cone adapted to selectively transfer torque between the retention member and the roller cone.

According to another aspect of the present invention, a method of retaining a roller cone on a bearing pin of a drill bit body is provided that includes: coupling a retention member to the roller cone; inserting an end of the bearing pin into the roller cone; transmitting torque from the roller cone to the retention member; and then coupling the retention member to the bearing pin.

According to another aspect of the present invention, a roller cone assembly for retaining a roller cone on a bearing pin of a drill bit body is provided that includes: a roller cone defining a cavity adapted to receive an end of the bearing pin; a retaining assembly coupled to the roller cone adapted to receive the end of the bearing pin and defining a cavity; a torque transfer member received within and mating with the cavity of the retaining assembly; and a spring comprising one end received within the cavity of the retaining assembly and another end received within the cavity of the roller cone, wherein the torque transfer member is adapted to be received within and mate with the cavity of the roller cone.

BRIEF DESCRIPTION OF DRAWINGS

Some of the features and benefits of the present invention having been stated, others will become apparent as the description proceeds when taken in conjunction with the accompanying drawings, in which.

DETAILED DESCRIPTION OF THE EXEMPLARY EMBODIMENTS

The present invention will now be described more fully hereinafter with reference to the accompanying drawings in which exemplary embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Figure 1A:
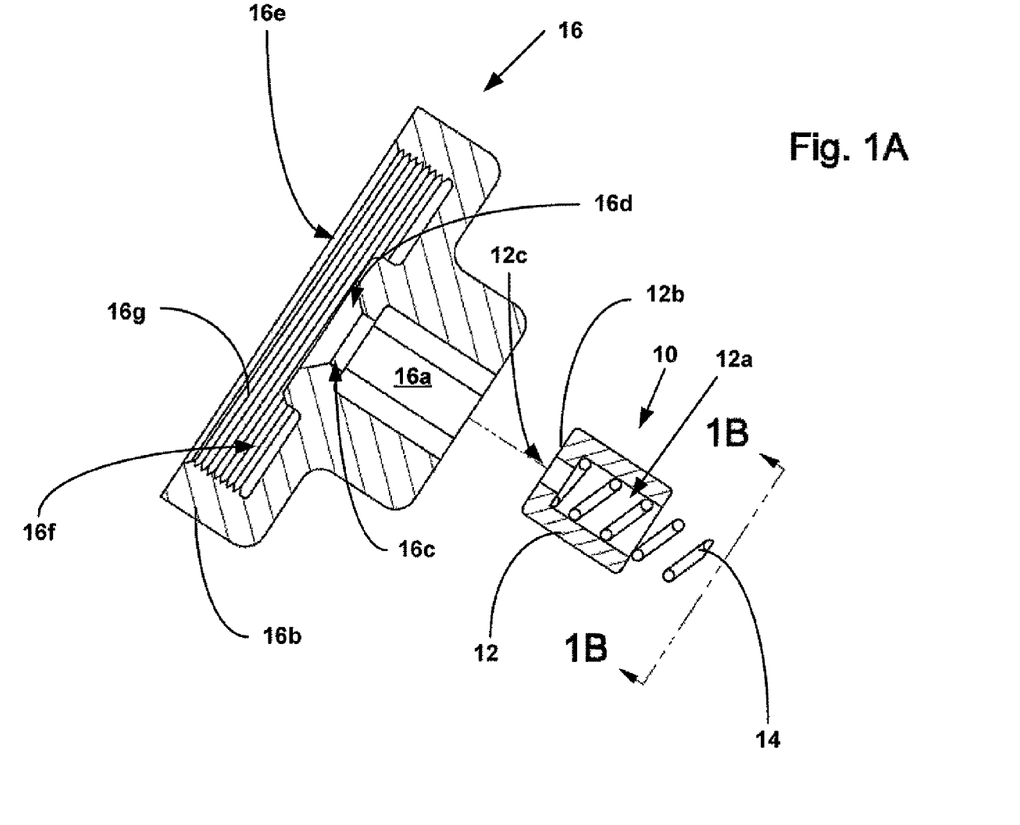
FIG. 1A is a cross sectional exploded view of an exemplary embodiment of an assembly including a hex drive and spring and a head pilot pin.
Figure 1B:
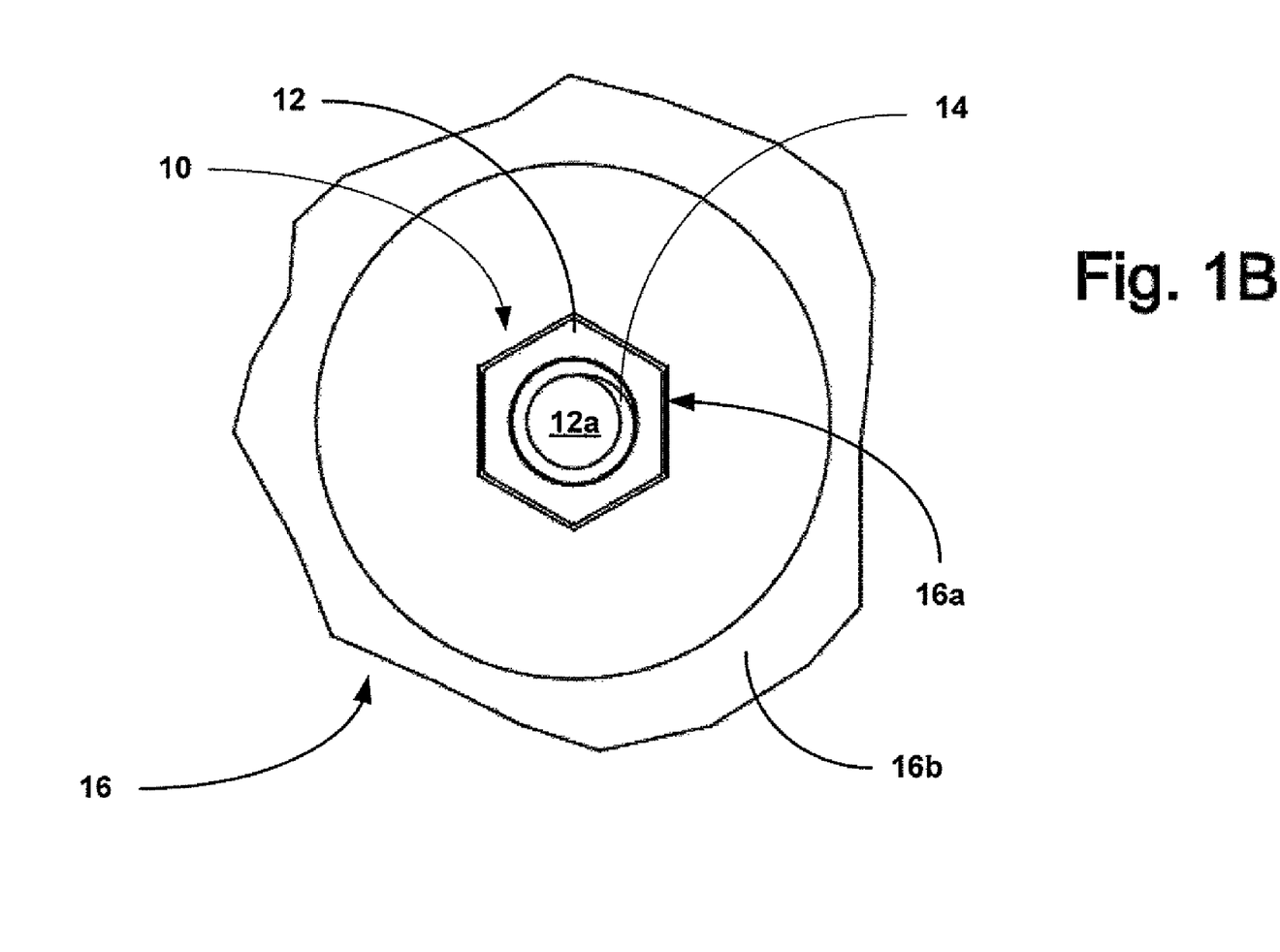
FIG. 1B is a top view of the assembly of FIG. 1A.

Referring initially to FIGS. 1A and 1B, an exemplary embodiment of a hex drive 10 includes a housing 12 that defines an internal cavity 12a extending from an open end of the housing and includes an end wall 12b at another end of the housing that defines an opening 12c that extends therethrough to one end of the cavity. In an exemplary embodiment, the housing 12 includes six outer surfaces extending in a longitudinal direction that together define a hexagonal shape in cross section. A helical spring 14 is adapted to mate with and is received within the cavity 12a of the housing 12. In an exemplary embodiment, the axial free length of the spring 14 is greater than the axial depth of the cavity 12a.

In an exemplary embodiment, the closed end of the housing 12 of the hex drive 10 is adapted to mate with and is received within an end of a hexagonal passage 16a defined within an end of a head pilot pin 16 that includes an external flange 16b at another end. In an exemplary embodiment, the axial length of the housing 12 is less than the axial depth of the cavity 16a. The head pilot pin 16 further defines a cylindrical passage 16c extending from the other end of the hexagonal passage 16a, a tapered conical passage 16d extending from an end of the cylindrical passage, and a cylindrical opening 16e at another end of the head pilot pin that further defines an annular recess 16f. In an exemplary embodiment, the interior walls of the cylindrical opening 16e at the other end of the head pilot pin include internal threads 16g.

Figure 2A:
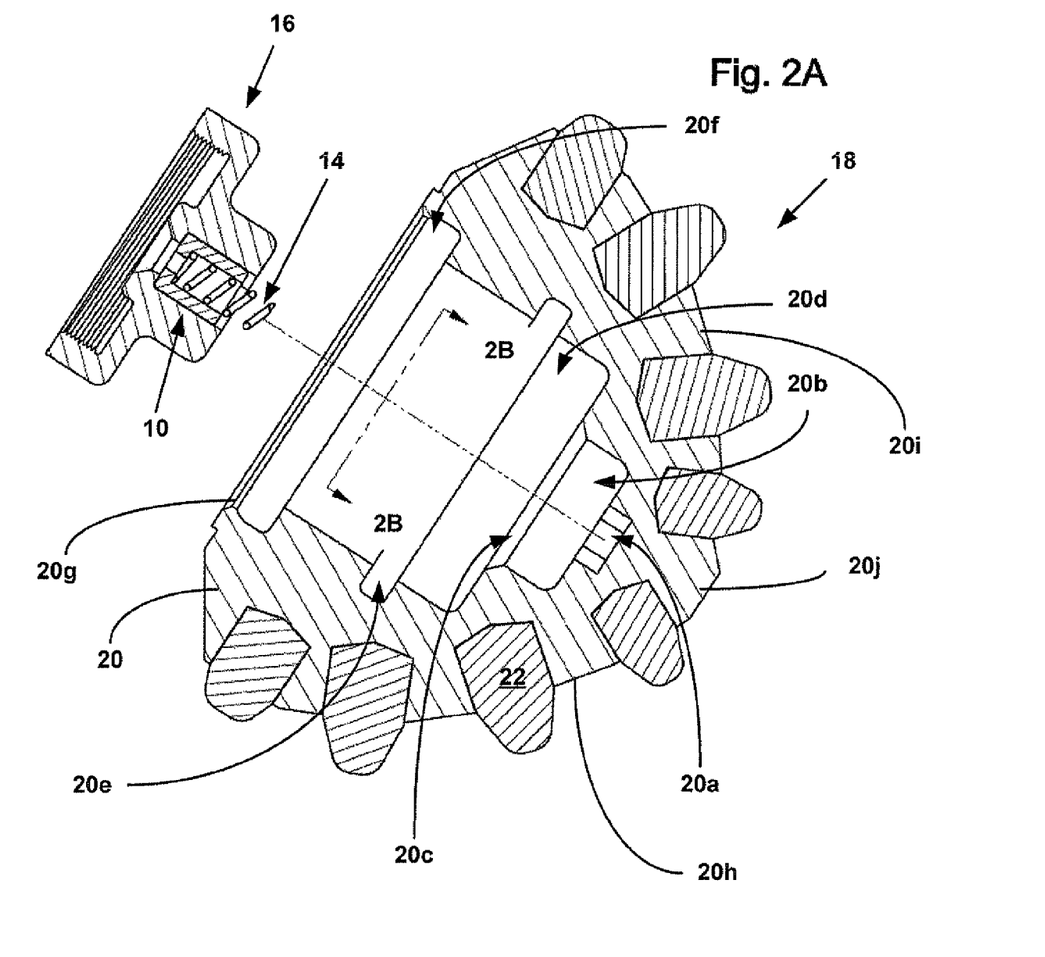
FIG. 2A is a cross sectional exploded view of an exemplary embodiment of an assembly including the assembly of FIG. 1A and a rotary cone.
Figure 2B:
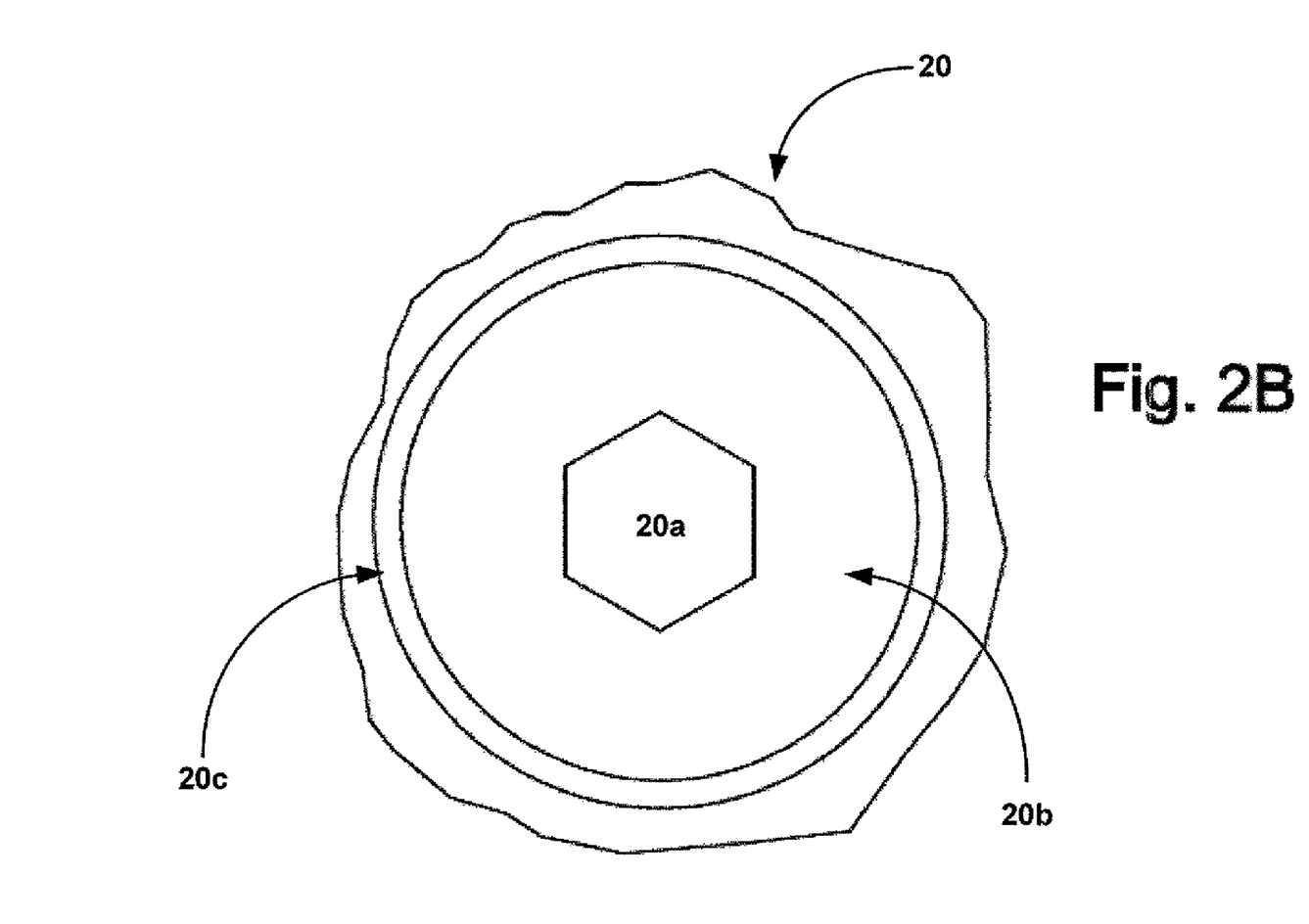
FIG. 2B is a bottom view of the interior of the rotary cone of the assembly of FIG. 2A.

Referring now to FIGS. 2A and 2B, an exemplary embodiment of a roller cone 18 includes an open ended housing 20 that defines a hexagonal cavity 20a at one end, a cylindrical cavity 20b extending from the hexagonal cavity, a tapered conical cavity 20c extending from the cylindrical cavity, a cylindrical cavity 20d extending from the conical cavity that includes an annular recess 20e, and cylindrical cavity 20f having a rounded lip 20g at one end extending from the cylindrical cavity 20d. The external surface of the housing 20 of the roller cone 18 includes a tapered side profiles, 20h and 20i, and a narrow end point 20j. In an exemplary embodiment, cutting elements 22 are embedded in, and coupled to, the tapered side profiles, 20h and 20i, of the housing 20 of the roller cone 18.

Figure 3A:
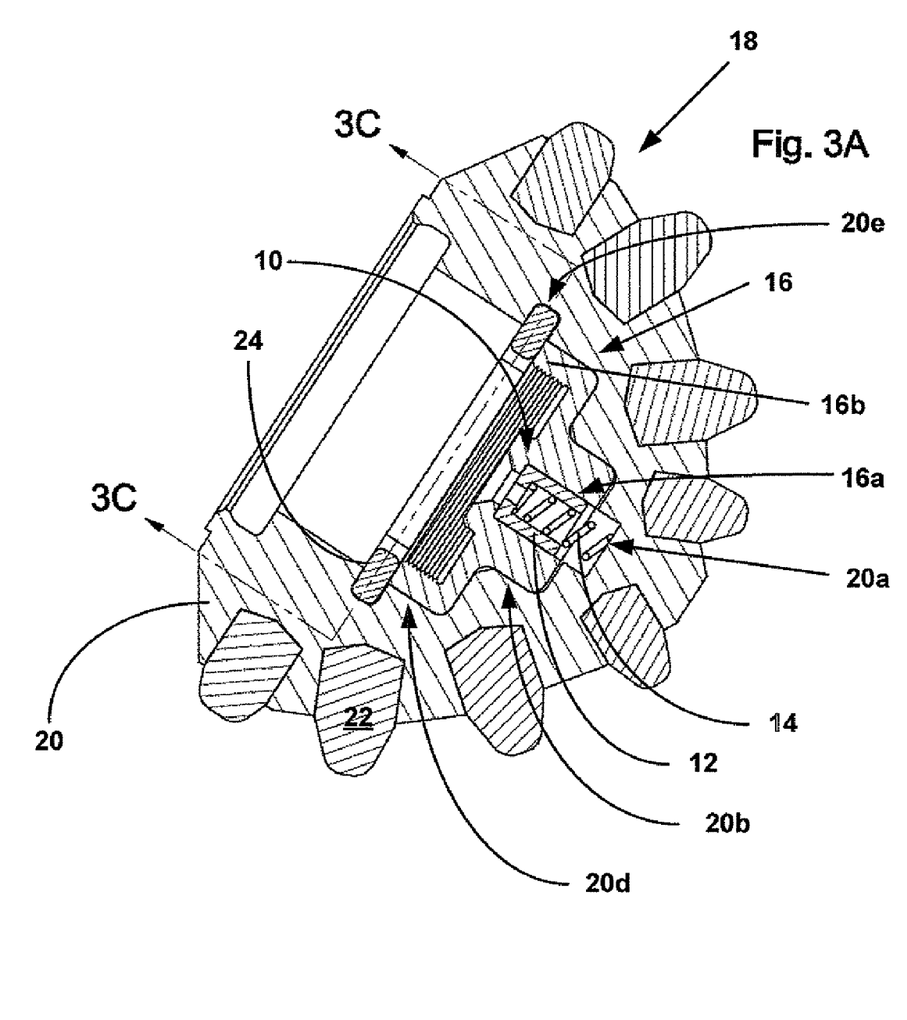
FIG. 3A is a cross sectional view of an exemplary embodiment of an assembly including the assemblies of FIGS. 1A and 2A and a segmented thrust washer.
Figure 3B:
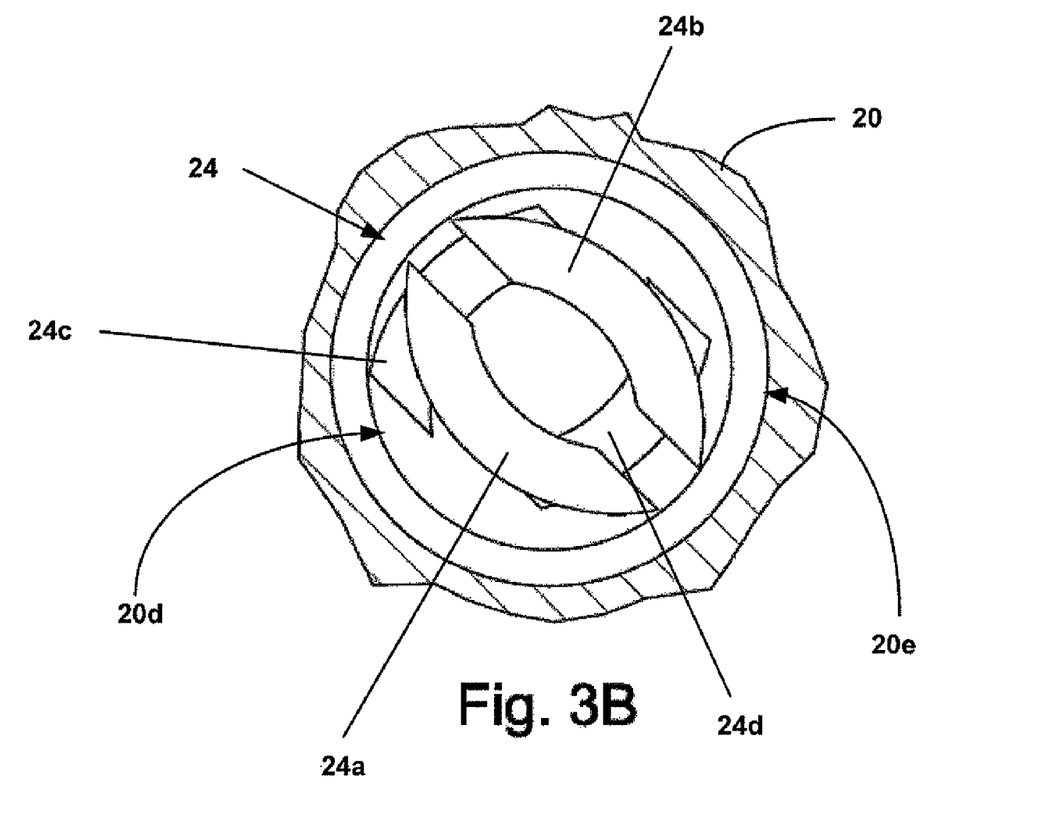
FIG. 3B is a cross sectional view of the assembly of FIG. 3A illustrating the assembly of the segmented thrust washer.
Figure 3C:
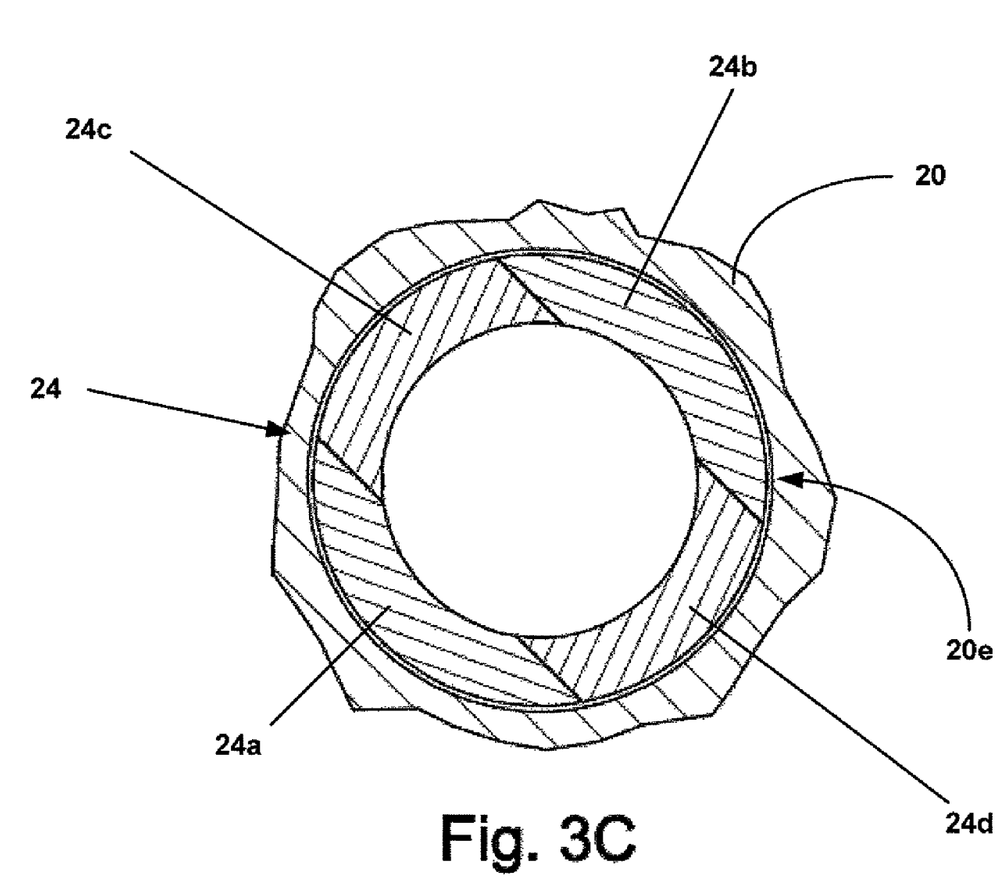
FIG. 3C is a cross sectional view of the assembly of FIG. 3A illustrating the completed assembly of the segmented thrust washer.

Referring now to FIGS. 3A, 3B, and 3C, in an exemplary embodiment, the cylindrical cavities, 20b and 20d, of the open end of the housing 20 of the roller cone 18 are adapted to mate with and receive the end and the external flange 16b of the head pilot pin 16.

In an exemplary embodiment, when the head pilot pin 16 is assembled into the open end of the housing 20 of the roller cone 18, the hexagonal cavity 16a of the head pilot pin is positioned in opposing relation to the hexagonal cavity 20a of the housing of the roller cone. In this manner, as will be described below, the housing 12 of the hex drive 10 may be at least partially displaced into the hexagonal cavity 20a of the housing 20 of the roller cone 18.

In an exemplary embodiment, when the head pilot pin 16 is assembled into the open end of the housing 20 of the roller cone 18, the end of the helical spring 14 is positioned proximate a bottom end face of the hexagonal cavity 20a of the housing of the roller cone. In this manner, in an exemplary embodiment, the helical spring 14 provides a spring biasing force that, in the absence of a counter force, maintains the housing 12 of the hex drive 10 within the hexagonal cavity 16a of the head pilot pin 16.

In an exemplary embodiment, when the head pilot pin 16 is assembled into the open end of the housing 20 of the roller cone 18, the surface of the upper end face of the head pilot pin is aligned with a side wall of the annular recess 20e of the housing of the roller cone. As a result, in an exemplary embodiment, after the head pilot pin 16 has been assembled into the open end of the housing 20 of the roller cone 18 such that the surface of the upper end face of the head pilot pin is aligned with a side wall of the annular recess 20e of the housing of the roller cone, a segmented thrust washer assembly 24 may then be assembled and inserted into the annular recess 20e of the housing 20 of the roller cone 18 to thereby prevent the head pilot pin from being disassembled from the roller cone.

In particular, as illustrated in FIGS. 3B and 3C, the washer assembly 24 includes washer elements, 24a, 24b, 24c, and 24d, that, when assembled, provide the washer assembly. The washer elements, 24a, 24b, 24c, and 24d, are inserted into the annular recess 20e of the housing 20 of the roller cone 18 to provide the washer assembly 24. As a result, the washer assembly 24 mates with and an outer portion is received within the annular recess 20e of the housing 20 of the roller cone 18. In an exemplary embodiment, an end face of the inner portion of the washer assembly 24 is positioned proximate the upper end face of the head pilot pin 16. In this manner, the head pilot pin 16 is prevented from being disassembled from the roller cone 18.

Figure 4:
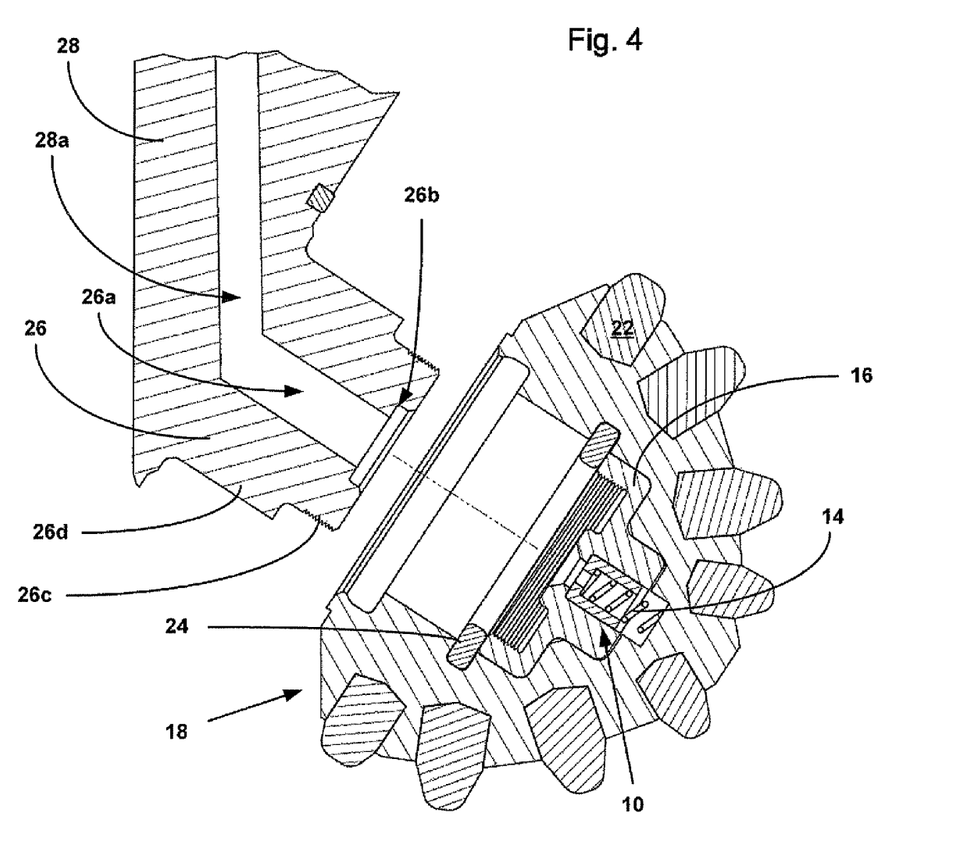
FIG. 4 is an exploded cross sectional view of the assembly of FIG. 3A and a leg of a drill bit.

Referring now to FIG. 4, in an exemplary embodiment, the assembly, including the hex drive 10, the spring 14, the head pilot pin 16, the roller cone 18 and the thrust washer assembly 24, is then positioned proximate an end of a bearing pin 26 that depends from a bit body 28. In an exemplary embodiment, the bearing pin 26 and bit body 28 together define passageways, 26a and 28a, passing therethrough. In an exemplary embodiment the bearing pin 26 further defines a tapered cylindrical opening 26b at one end that extends from the end of the bearing pin to the passageway 26a and includes external threads 26c at one end and an external flange 26d.

Figure 5:
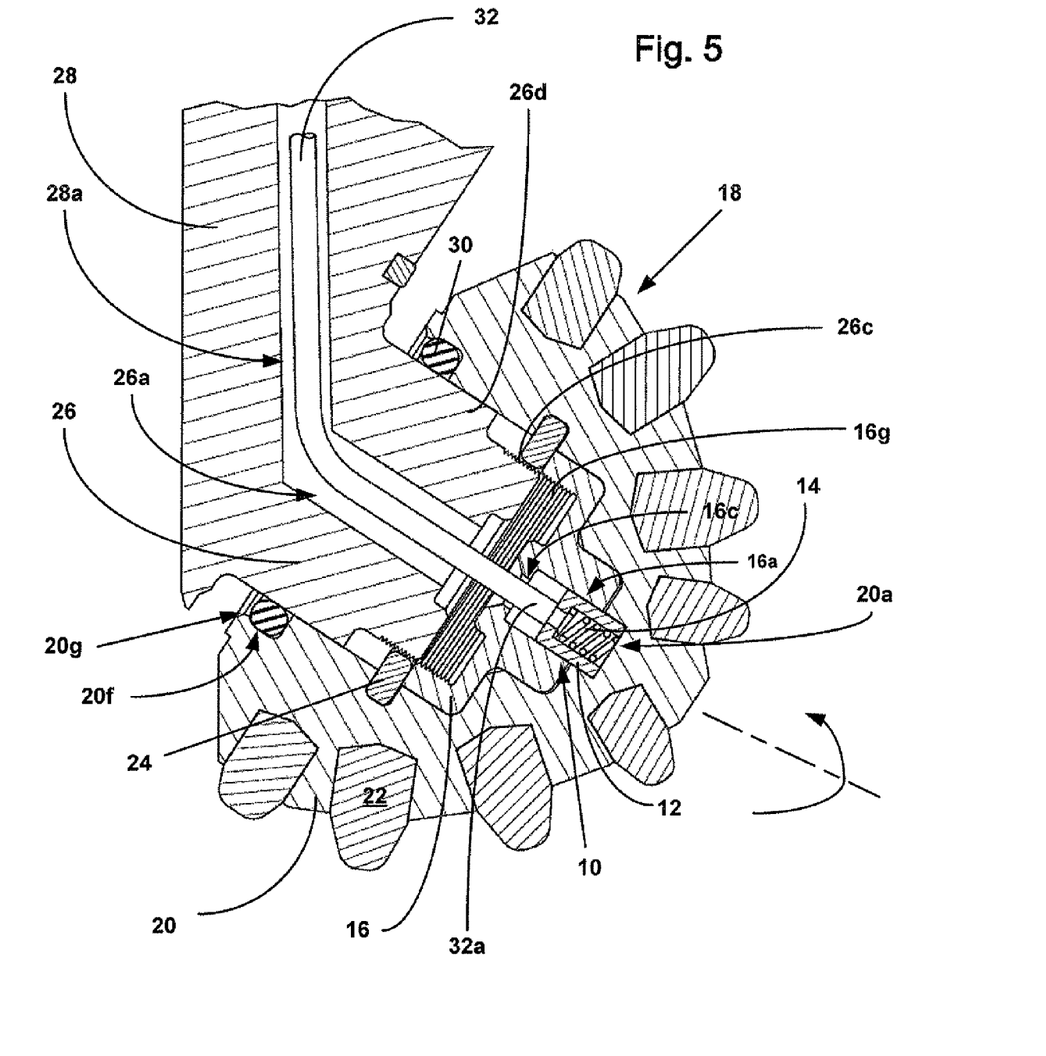
FIG. 5 is an exploded cross sectional view of the assembly of the assembly of FIG. 3A onto a leg of a drill bit.

Referring now to FIG. 5, in an exemplary embodiment, an O-ring 30 is then positioned in the cylindrical cavity 20f of the housing 20 of the roller cone 18 below the rounded lip 20g. In an exemplary embodiment, the assembly, including the hex drive 10, the spring 14, the head pilot pin 16, the roller cone 18 and the thrust washer assembly 24, is then positioned onto the end of the bearing pin 26 until the end bearing pin is positioned proximate the internal threads 16g of the head pilot pin. In an exemplary embodiment, a flexible rod 32 is then positioned within and through the passages, 26a and 28a, of the bearing pin 26 and bit body 28, respectively, until the end 32a of the flexible rod passes through the cylindrical passage 16c of the head pilot pin 16 and engages an end face of the housing 12 of the hex drive 10. Further displacement of the end 32a of the flexible rod 32 then displaces the housing 12 of the hex drive 10, overcoming the spring bias force of the helical spring 14, and displacing a portion of the other end of the housing of the hex drive into the hexagonal cavity 20a of the housing 20 of the roller cone 18. As a result, one portion of the housing 12 of the hex drive 10 is positioned within the hexagonal passage 16a of the head pilot pin 16 and another portion of the housing of the hex drive is positioned within the hexagonal cavity 20a of the housing 20 of the roller cone 18.

Figure 6:
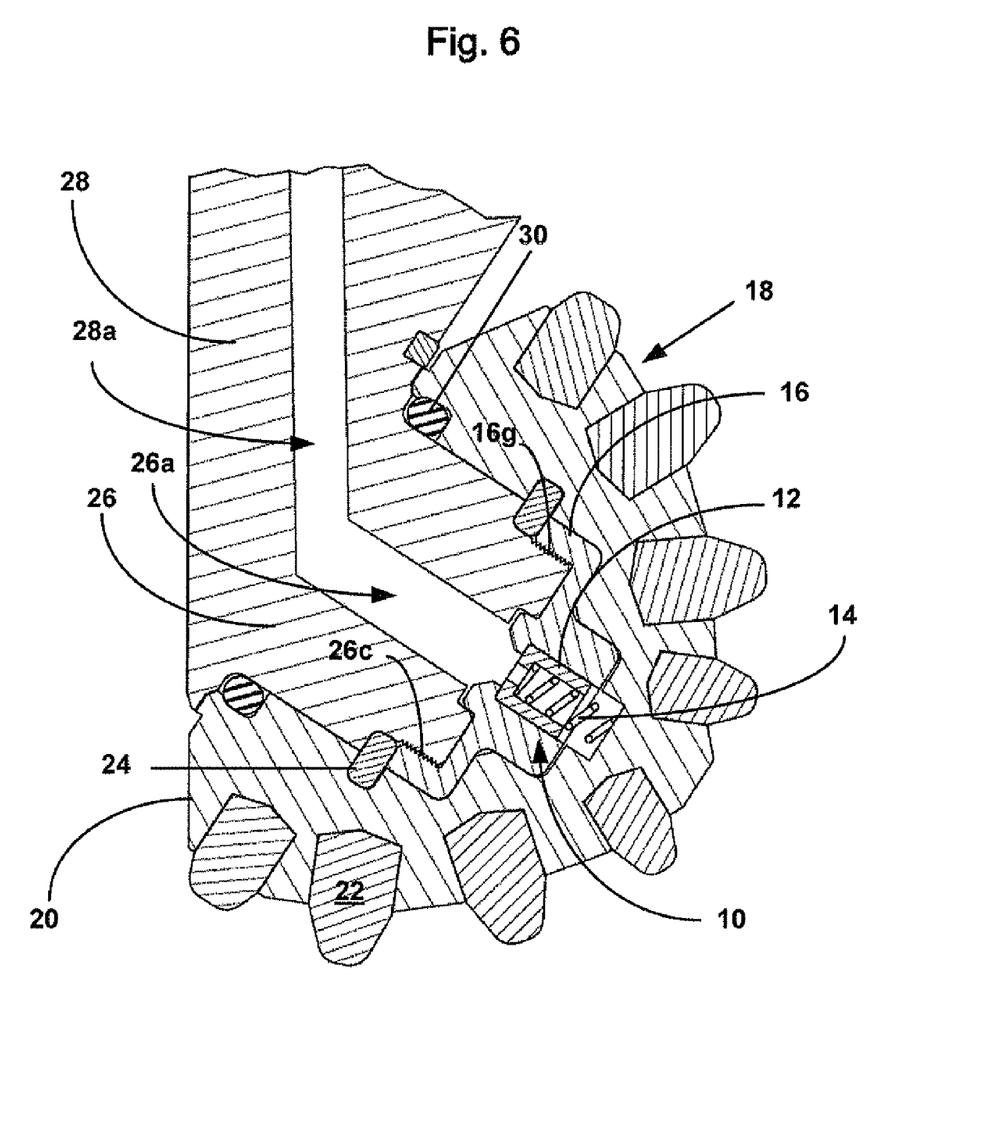
FIG. 6 is an exploded cross sectional view of the completed assembly of the assembly of FIG. 3A onto a leg of a drill bit.

As a result, as illustrated in FIG. 6, torque may then be applied to the roller cone 18 to thereby cause the internal threads 16g of the head pilot pin 16 to engage the external threads 26c of the end of the bearing pin 26. In an exemplary embodiment, torque is applied to the roller cone 18 until the internal threads 16g of the head pilot pin 16 fully engage the external threads 26c of the end of the bearing pin 26.

In an exemplary embodiment, once the internal threads 16g of the head pilot pin 16 have fully engaged the external threads 26c of the end of the bearing pin 26, the flexible rod 32 is removed from the passages, 26a and 28a, of the bearing pin 26 and bit body 28, respectively, and out of engagement with the closed end of the housing 12 of the hex drive 10. As a result, the spring biasing force of the spring 14 displaces the housing 12 of the hex drive 10 out of the hexagonal cavity 20a of the housing 20 of the roller cone 18. As a result, torque may no longer be applied from the roller cone 18 to the head pilot pin 16. In this manner, the roller cone 18 is retained on the bearing pin 26 of the bit body 28 with the thrust washer 24 preventing removal of the roller cone.

In an exemplary embodiment, if the roller cone 18 must be removed from the bearing pin 26 of the bit body 28 such as, for example, to perform maintenance, repair, or replacement, then the flexible rod 32 is again positioned within and through the passages, 26a and 28a, of the bearing pin 26 and bit body 28, respectively, until the end 32a of the flexible rod passes through the cylindrical passage 16c of the head pilot pin 16 and engages an end face of the housing 12 of the hex drive 10. Further displacement of the end 32a of the flexible rod then displaces the housing 12 of the hex drive 10, overcoming the spring bias force of the helical spring 14, and displacing a portion of the other end of the housing of the hex drive into the hexagonal cavity 20a of the housing 20 of the roller cone 18. As a result, one portion of the housing 12 of the hex drive 10 is again positioned within the hexagonal passage 16a of the head pilot pin 16 and another portion of the housing of the hex drive is positioned within the hexagonal cavity 20a of the housing 20 of the roller cone 18. In an exemplary embodiment, torque may then be applied to the roller cone 18 to thereby cause the internal threads 16g of the head pilot pin 16 to disengage from the external threads 26c of the end of the bearing pin 26. In an exemplary embodiment, the assembly, including the hex drive 10, the spring 14, the head pilot pin 16, the roller cone 18 and the thrust washer assembly 24, may then be removed from engagement with the bearing pin 26.

Thus, the head pilot pin 16 provides a retention member for coupling the roller cone 18 to the bearing pin 26 of the bit body 28 by providing a supporting structure that permits the hex drive 10 to be selectively displaced into and out of engagement with the housing 20 of the roller cone.

Figure 6A:
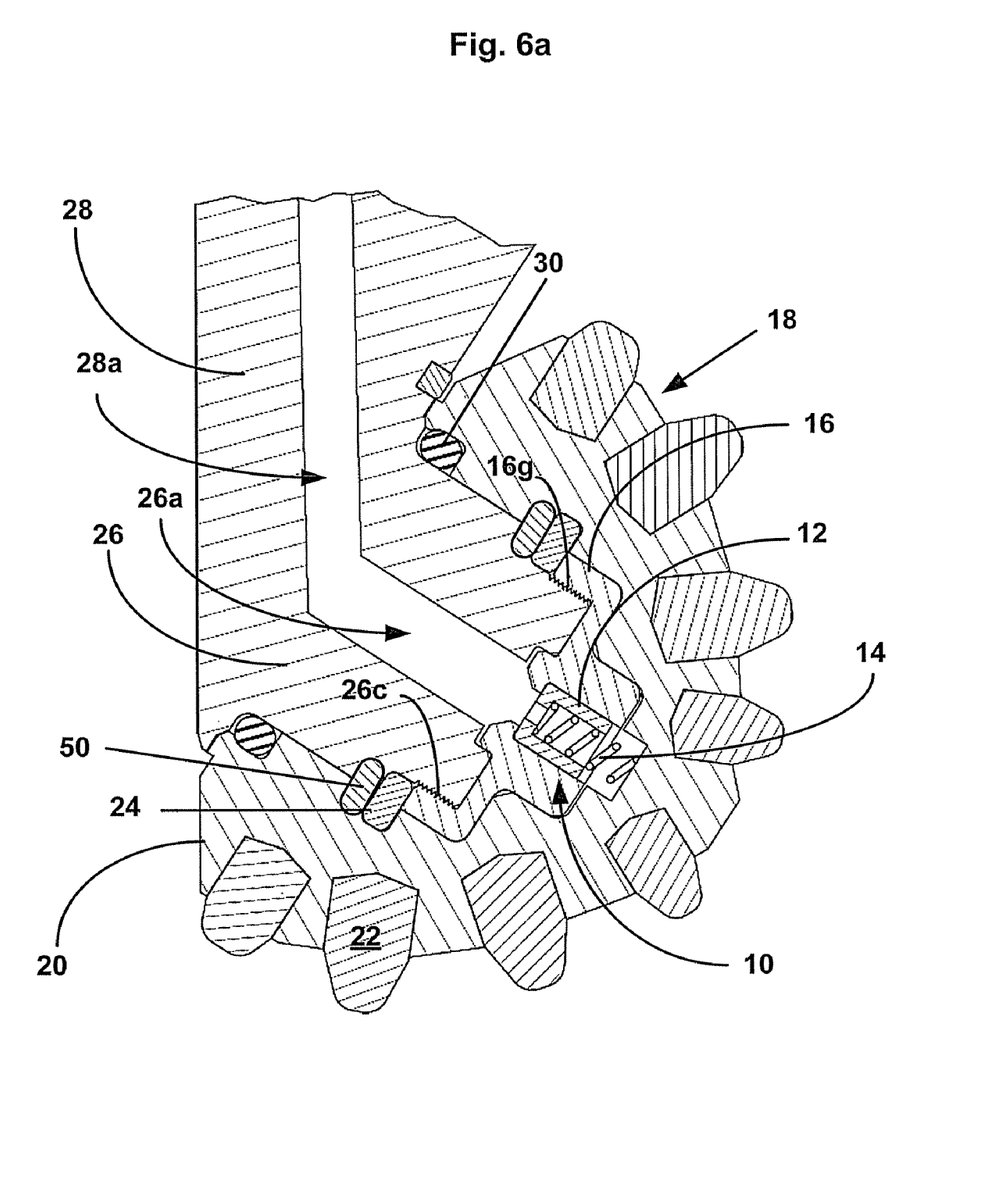
FIG. 6a is an exploded cross sectional view of an alternative embodiment of the completed assembly of the assembly of FIG. 3A onto a leg of a drill bit.
Figure 6B:
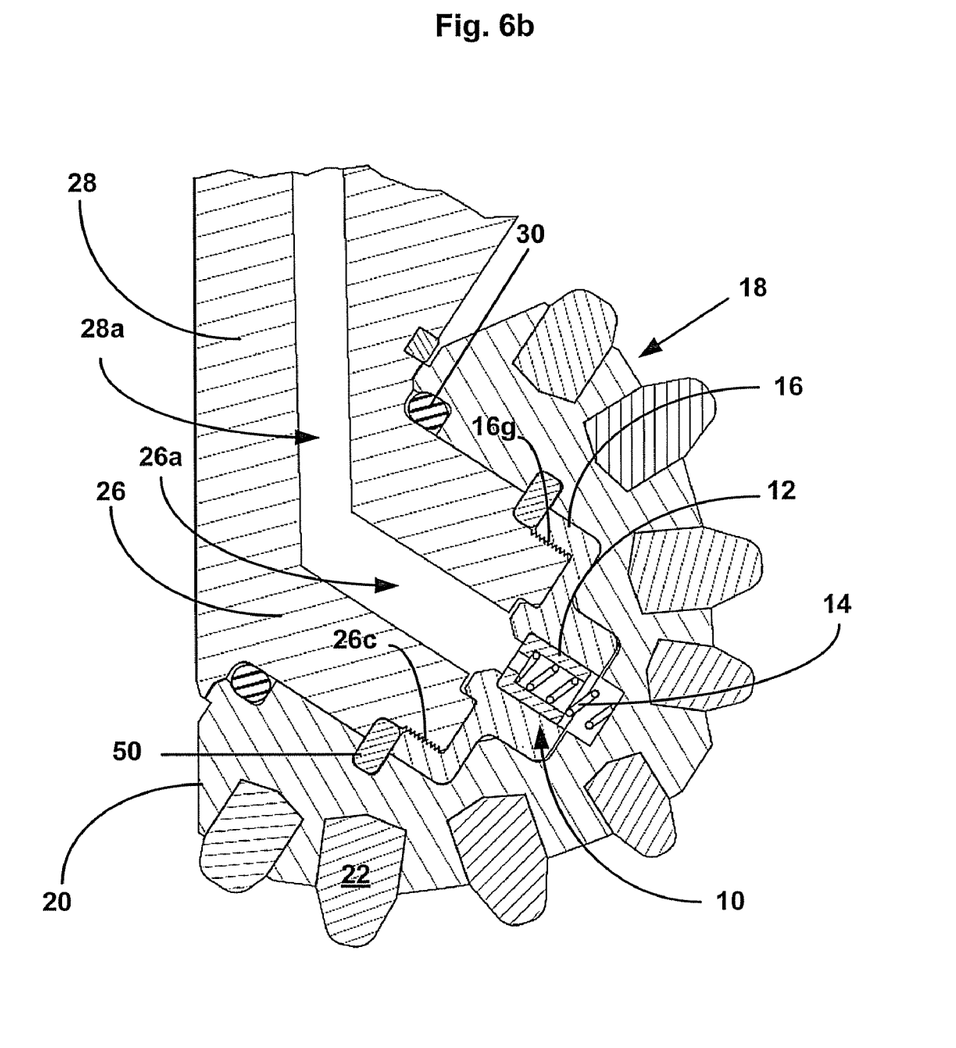
FIG. 6b is an exploded cross sectional view of an alternative embodiment of the completed assembly of the assembly of FIG. 3A onto a leg of a drill bit.

In an alternative embodiment, as illustrated in FIGS. 6a and 6b, the head pilot pin 16 may be coupled to the housing 20 of the roller cone 18 using one or more other devices, in addition to or in substitution for the thrust washer assembly 24 which may, for example, include a ball bearing assembly 50.

In an alternative embodiment, the head pilot pin 16 may be coupled to the bearing pin 26, using one or more methods or devices in addition to or in substitution for the threads, 16g and 26c, which may, for example, include shrink fitting the head pilot pin to the bearing pin and/or using an adhesive material such as, for example, an epoxy.

In an alternative embodiment, the torque may be transferred between the roller cone 18 and head pilot pin 16, using one or more other devices, in addition to or in substitution for the hex drive 10 which may, for example, include using a device such as a shear pin or removable drive pin between the head pilot pin and housing 20 of the roller cone upon assembly.

In an alternative embodiment, the hex drive 10 may be displaced to engage or disengage the hexagonal cavity 20a of the housing 20 of the roller cone 18 using one or more other devices, in addition to or in substitution for the flexible rod 32, which may, for example, include a magnetic field, an actuator built into the housing of the roller cone, and/or hydraulic pressure. Furthermore, in an alternative embodiment, an opening may also be provided in the housing 20 of the roller cone 18 that may permit a rod or other device to latch on the end of the hex drive 10 and thereby enable an operator to displace the hex drive 10 into or out of engagement with the hexagonal cavity 20a of the housing 20 of the roller cone 18.

An apparatus for retaining a roller cone on a bearing pin of a drill bit body has been described that includes a drill bit body, a bearing pin coupled to the drill bit body, a retention member coupled to the bearing pin, a roller cone coupled to the retention member, and a torque transfer member coupled to the retention member and the roller cone adapted to selectively transfer torque between the retention member and the roller cone. In an exemplary embodiment, the roller cone defines a cavity for receiving an end of the bearing pin and comprises an internal annular groove, and the apparatus further includes a thrust bearing member received within the internal annular groove of the roller cone and receiving an end of the bearing pin. In an exemplary embodiment, the thrust bearing member includes a washer. In an exemplary embodiment, the washer comprises a segmented thrust washer. In an exemplary embodiment, the thrust bearing member includes a ball bearing. In an exemplary embodiment, the retention member defines a cavity, and the torque transfer member is received within and mates with the cavity of the retention member. In an exemplary embodiment, the roller cone defines a cavity, and the torque transfer member is adapted to be received within and mate with the cavity of the roller cone. In an exemplary embodiment, the apparatus further includes a spring having one end received within the cavity of the retention member and another end received within the cavity of the roller cone for biasing the torque transfer member into the cavity of the retention member. In an exemplary embodiment, the cavity defined within the retention member includes a hexagonal cross sectional profile, and the cavity defined within the roller cone comprises a hexagonal cross sectional profile. In an exemplary embodiment, the retention member is threadably coupled to the bearing pin. In an exemplary embodiment, the coupling between the retention member and the bearing pin includes a shrink fit coupling. In an exemplary embodiment, the torque transfer member defines an internal cavity for receiving an end of the spring. In an exemplary embodiment, the torque transfer member includes an outer profile that is hexagonal in cross section.

A method of retaining a roller cone on a bearing pin of a drill bit body has been described that includes coupling a retention member to the roller cone, inserting an end of the bearing pin into the roller cone, transmitting torque from the roller cone to the retention member, and then coupling the retention member to the bearing pin. In an exemplary embodiment, transmitting torque from the roller cone to the retention member includes coupling a torque transfer member to the retention member, displacing the torque transfer member into engagement with the roller cone, and then transmitting torque from the roller cone to the retention member. In an exemplary embodiment, the method further includes coupling the retention member to the bearing pin, and then displacing the torque transfer member out of engagement with the roller cone. In an exemplary embodiment, the method further includes coupling the retention member to the bearing pin, and then no longer transmitting torque from the roller cone to the retention member. In an exemplary embodiment, displacing the torque transfer member into engagement with the roller cone includes applying a contact force to the torque transfer member. In an exemplary embodiment, displacing the torque transfer member into engagement with the roller cone comprises moving a flexible rod into and through the bearing pin. In an exemplary embodiment, displacing the torque transfer member into engagement with the roller cone comprises applying a non-contact force to the torque transfer member.

A roller cone assembly for retaining a roller cone on a bearing pin of a drill bit body has been described that includes a roller cone defining a cavity adapted to receive an end of the bearing pin, a retaining assembly coupled to the roller cone adapted to receive the end of the bearing pin and defining a cavity, a torque transfer member received within and mating with the cavity of the retaining assembly, and a spring comprising one end received within the cavity of the retaining assembly and another end received within the cavity of the roller cone, wherein the torque transfer member is adapted to be received within and mate with the cavity of the roller cone.

In an exemplary embodiment, the cavity defined within the roller cone includes a hexagonal cross sectional profile. In an exemplary embodiment, the roller cone defines an internal annular recess, and the retaining assembly comprises a washer received within the recess of the roller cone. In an exemplary embodiment, the washer is a segmented thrust washer. In an exemplary embodiment, the cavity of the retaining assembly has a hexagonal cross sectional profile. In an exemplary embodiment, the retaining assembly comprises threads adapted to threadably engage the end of the bearing pin. In an exemplary embodiment, the torque transfer member defines an internal cavity for receiving an end of the spring. In an exemplary embodiment, the torque transfer member has an outer profile that is hexagonal in cross section. In an exemplary embodiment, the retaining assembly is a ball bearing.

It is understood that variations may be made in the above without departing from the scope of the invention. For example, the teachings of the exemplary embodiments may also be used to provide a connection system for other types of rotary devices. While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. A method of retaining a roller cone on a bearing pin of a drill bit body, comprising:
   coupling a retention member to the roller cone;
   inserting an end of the bearing pin into the roller cone;
   transmitting torque from the roller cone to the retention member; and
   then coupling the retention member to the bearing pin.

2. The method of claim 1, wherein transmitting torque from the roller cone to the retention member comprises:
   coupling a torque transfer member to the retention member;
   displacing the torque transfer member into engagement with the roller cone; and
   then transmitting torque from the roller cone to the retention member.

3. The method of claim 2, further comprising:
   coupling the retention member to the bearing pin; and
   then displacing the torque transfer member out of engagement with the roller cone.

4. The method of claim 2, wherein displacing the torque transfer member into engagement with the roller cone comprises applying a contact force to the torque transfer member.

5. The method of claim 4, wherein displacing the torque transfer member into engagement with the roller cone comprises moving a flexible rod into and through the bearing pin.

6. The method of claim 2, wherein displacing the torque transfer member into engagement with the roller cone comprises applying a non-contact force to the torque transfer member.

7. The method of claim 1, further comprising:
   coupling the retention member to the bearing pin; and
   then no longer transmitting torque from the roller cone to the retention member.

8. A roller cone assembly for retaining a roller cone on a bearing pin of a drill bit body, comprising:
   a roller cone defining a cavity adapted to receive an end of the bearing pin;
   a retaining assembly coupled to the roller cone adapted to receive the end of the bearing pin and defining a cavity;
   a torque transfer member received within and mating with the cavity of the retaining assembly; and
   a spring comprising one end received within the cavity of the retaining assembly and another end received within the cavity of the roller cone;
   wherein the torque transfer member is adapted to be received within and mate with the cavity of the roller cone.

9. The assembly of claim 8, wherein the cavity defined within the roller cone comprises a hexagonal cross sectional profile.

10. The assembly of claim 8, wherein the roller cone defines an internal annular recess; and wherein the retaining assembly comprises a washer received within the recess of the roller cone.

11. The assembly of claim 10, wherein the washer comprises a segmented thrust washer.

12. The assembly of claim 8, wherein the cavity of the retaining assembly comprises a hexagonal cross sectional profile.

13. The assembly of claim 8, wherein the retaining assembly comprises threads adapted to threadably engage the end of the bearing pin.

14. The assembly of claim 8, wherein the torque transfer member defines an internal cavity for receiving an end of the spring.

15. The assembly of claim 8, wherein the torque transfer member comprises an outer profile that is hexagonal in cross section.

16. The assembly of claim 8, wherein the retaining assembly comprises a ball bearing.

17. An apparatus for retaining a roller cone on a bearing pin of a drill bit body, comprising:
   a drill bit body;
   a bearing pin coupled to the drill bit body;
   a retention member coupled to the bearing pin;
   a roller cone coupled to the retention member; and
   a torque transfer member coupled to the retention member and the roller cone adapted to selectively transfer torque between the retention member and the roller cone;
   wherein the retention member defines a cavity; and wherein the torque transfer member is received within and mates with the cavity of the retention member;
   wherein the torque transfer member is adapted to be received within and mate with the cavity of the roller cone; and
   wherein the apparatus further comprises:
   a spring comprising one end received within the cavity of the retention member and another end received within the cavity of the roller cone for biasing the torque transfer member into the cavity of the retention member.

18. An apparatus for retaining a roller cone on a bearing pin of a drill bit body, comprising:
   a drill bit body;
   a bearing pin coupled to the drill bit body;
   a retention member coupled to the bearing pin;
   a roller cone coupled to the retention member; and
   a torque transfer member coupled to the retention member and the roller cone adapted to selectively transfer torque between the retention member and the roller cone;
   wherein the retention member defines a cavity;
   wherein the torque transfer member is received within and mates with the cavity of the retention member;

wherein the roller cone defines a cavity;
wherein the torque transfer member is adapted to be received within and mate with the cavity of the roller cone;
wherein the cavity defined within the retention member comprises a hexagonal cross sectional profile; and
wherein the cavity defined within the roller cone comprises a hexagonal cross sectional profile.

19. An apparatus for retaining a roller cone on a bearing pin of a drill bit body, comprising:
a drill bit body;
a bearing pin coupled to the drill bit body;
a retention member coupled to the bearing pin;
a roller cone coupled to the retention member; and
a torque transfer member coupled to the retention member and the roller cone adapted to selectively transfer torque between the retention member and the roller cone;
wherein the retention member defines a cavity;
wherein the torque transfer member is received within and mates with the cavity of the retention member;
wherein the roller cone defines a cavity;
wherein the torque transfer member is adapted to be received within and mate with the cavity of the roller cone;
wherein the apparatus further comprises a spring comprising one end received within the cavity of the retention member and another end received within the cavity of the roller cone for biasing the torque transfer member into the cavity of the retention member; and
wherein the torque transfer member defines an internal cavity for receiving an end of the spring.

20. A method of retaining a roller cone on a bearing pin of a drill bit body, comprising:
coupling a retention member to the roller cone;
inserting an end of the bearing pin into the roller cone;
transmitting torque from the roller cone to the retention member; and
then coupling the retention member to the bearing pin;
wherein transmitting torque from the roller cone to the retention member comprises:
coupling a torque transfer member to the retention member;
displacing the torque transfer member into engagement with the roller cone; and
then transmitting torque from the roller cone to the retention member;
wherein displacing the torque transfer member into engagement with the roller cone comprises applying a contact force to the torque transfer member; and
wherein displacing the torque transfer member into engagement with the roller cone comprises moving a flexible rod into and through the bearing pin.

21. A method of retaining a roller cone on a bearing pin of a drill bit body, comprising:
coupling a retention member to the roller cone;
inserting an end of the bearing pin into the roller cone;
transmitting torque from the roller cone to the retention member; and
then coupling the retention member to the bearing pin;
wherein transmitting torque from the roller cone to the retention member comprises:
coupling a torque transfer member to the retention member;
displacing the torque transfer member into engagement with the roller cone; and
then transmitting torque from the roller cone to the retention member; and
wherein displacing the torque transfer member into engagement with the roller cone comprises applying a non-contact force to the torque transfer member.

* * * * *